111 United States Patent [19]

Orshansky, Jr., deceased et al.

[11] 4,114,475
[45] Sep. 19, 1978

[54] HYDROMECHANICAL TRANSMISSION WITH THREE SIMPLE PLANETARY ASSEMBLIES, ONE SUN GEAR BEING MOUNTED ON THE OUTPUT SHAFT AND THE OTHER TWO ON A COMMON SHAFT CONNECTED TO AN INPUT-DRIVEN HYDRAULIC MODULE

[75] Inventors: Elias Orshansky, Jr., deceased, late of San Francisco, Calif., by Betty Bacon Orshansky, executrix; William E. Weseloh, San Diego, Calif.

[73] Assignee: Orshansky Transmission Corporation, New York, N.Y.

[21] Appl. No.: 787,766

[22] Filed: Apr. 15, 1977

[51] Int. Cl.² .............. F16H 47/04; F16H 37/06; F16H 47/00; F16H 51/10
[52] U.S. Cl. .................... 74/687; 74/720.5; 74/730; 74/789; 74/765
[58] Field of Search .............. 74/687, 720 S, 730, 74/789, 765

[56] References Cited
U.S. PATENT DOCUMENTS

| 3,835,732 | 9/1974 | Mori et al. | 74/765 |
| 3,863,524 | 2/1975 | Mori et al. | 74/765 |
| 3,905,251 | 9/1975 | Greene | 74/687 |
| 3,969,957 | 7/1976 | Delalio | 74/687 |
| 3,979,972 | 9/1976 | Sakai et al. | 74/687 |

Primary Examiner—Samuel Scott
Assistant Examiner—J. W. Yates
Attorney, Agent, or Firm—Owen, Wickersham & Erickson

[57] ABSTRACT

A power transmission having three simple planetary assemblies, each having its own carrier and its own planet, sun, and ring gears. A speed-varying module is connected in driving relation to the input shaft and in driving relationship to the sun gears of the first two planetary assemblies, these two sun gears being connected together on a common shaft. The speed-varying means may comprise a pair of hydraulic units hydraulically interconnected so that one serves as a pump while the other serves as a motor and vice versa, one of the units having a variable stroke and being connected in driving relation to the input shaft, the other unit, which may have a fixed stroke, being connected in driving relation to the sun gears. The input shaft is also connected to drive the second ring gear and, furthermore is clutchable to the carrier of the third planetary assembly. A brake grounds the first carrier in the first range and in reverse and causes drive to be delivered to the output through the first ring gear in a hydrostatic mode. The carrier of the second planetary assembly drives the ring gear of the third planetary assembly, which is clutchable to the output shaft, and the sun gear of the third planetary assembly is mounted rigidly to the output shaft.

6 Claims, 3 Drawing Figures

HYDROMECHANICAL TRANSMISSION WITH THREE SIMPLE PLANETARY ASSEMBLIES, ONE SUN GEAR BEING MOUNTED ON THE OUTPUT SHAFT AND THE OTHER TWO ON A COMMON SHAFT CONNECTED TO AN INPUT-DRIVEN HYDRAULIC MODULE

The Government has rights in this invention pursuant to Contract No. EY-76-C-031165 awarded by the U.S. Energy Research and Development Administration.

BACKGROUND OF THE INVENTION

This invention relates to an improved transmission. It may be considered an improvement on the hydromechanical transmission described in U.S. Pat. No. 3,888,139 which issued June 10, 1975, to Elias Orshansky, Jr., or an improvement on our co-pending patent application, Ser. No. 787,851, filed Apr. 15, 1977.

The transmission of U.S. Pat. No. 3,888,139, that of Application Ser. No. 787,851, and the transmission of the present invention each provide a hydromechanical infinitely variable transmission. Each provides for improved utilization of vehicle engine power by enabling the engine to operate within a narrow speed range which has been optimized for minimum emissions, maximum fuel economy and maximum power, regardless of vehicle operating conditions.

In U.S. Pat. No. 3,888,139 the hydraulic units used as a speed-varying means were driven by gears from either the input or the reaction or both. The transmission of Application Ser. No. 785,851 and of the present invention eliminate those gears, four gears altogether, and their bearings, in order to reduce the size and weight of the transmission and to reduce the cost of the transmission.

It is also an object to provide a transmission which can weigh less than conventional transmissions.

The transmission of this invention and that of Application Ser. No. 787,851 have a concentric or coaxial construction and an entirely different hydrostatic start from the transmission of U.S. Pat. No. 3,888,139, in order to provide reduction in the number of parts, the size, the weight, and also the cost of the transmission.

In order to avoid having to use the extra gears which connected the planetary assemblies to the hydraulic units in U.S. Pat. No. 3,888,139, the hydraulic units in Application Ser. No. 787,851 and in the present invention may be especially designed to be installed in line with the planetary assemblies without a separate gear drive. This considerably reduces power losses, size, weight, and cost.

The present invention offers the opportunity for improved clutch construction, especially as regards oil supplies to the clutches, where only a few small-diameter seals are used.

In Application Ser. No. 787,851, all three sun gears are on a common shaft in driving relation with the hydraulic module, whereas in the present invention only two of the sun gears are on such a common shaft; and the third sun gear is mounted on the output shaft. Both inventions employ a releasable brake to hold the first planetary assembly's carrier stationary in a hydrostatic mode, and both of them release the brake for two succeeding hydromechanical ranges; however, in the former application both succeeding stages involved clutches engaging the output shaft, whereas in the present invention, the third or high-speed range clutches the input shaft to the third carrier, which then drives the output shaft through the third sun gear.

Since the high-range final output drive is through a sun gear, planet gear speeds and pitch line velocities are low. Consequently, bearing life is improved. Also, the noise levels in the high range can be kept low.

Furthermore, the first planetary assembly, to which the brake is attached, is of simple construction and is easily packaged.

A conventional torque converter transmission or a conventional manual transmission requires the imposition of many compromises upon the engine, because it must provide adequate performance over a wide range of torque and speed. The practice of most vehicle manufacturers of providing a selection of optional axle ratios for the vehicle is only one of the many attempts which have been made to reduce the compromise for any given application.

The infinitely variable transmission of this invention enables the engine to be operated at all times in a speed range in which it is capable of producing rated power. Therefore, vehicle performance in any given application can be maintained or even improved while utilizing a smaller engine. In contrast, infinitely variable transmissions of the pure hydrostatic type are limited to applications where significant power losses can be tolerated in return for the benefits of improved transmission control.

Hydromechanical transmissions offer the control benefits of hydrostatic transmissions, and, since only a portion of the engine power is transmitted by the hydraulic units, they provide a means for removing the performance barrier of excessive power losses. The extent to which any hydromechanical transmission can accomplish this is a function of the percentage of power which must be transmitted hydraulically.

The new transmission hereof can transmit high horsepower over a wide range of output speed variation at a constant input speed and horsepower. It differs from the previous transmission in its ability to transmit power over a wide range with a minimum of transmitted hydraulic horsepower, and a minimum of installed hydraulic horsepower. It also provides full engine braking over its entire range of operation.

The invention avoids the pitfalls of excessive complexity, speeds, or loads in the gear train. Maximun reliability and minimum cost have been obtained by utilizing standard commercial hydraulic unit design practice in which the units are operated totally within their long-life rated conditions of speed and power. In addition, the clutches can utilize the same low-cost paper elements presently employed in high-production automobile torque converter transmission. For a comparable power rating, a smaller number of elements than in a torque converter power shift transmission can be utilized, because at all shift points the clutch elements are virtually synchronous. The number of elements is, therefore, a function not of their thermal capacity, but of their steady-state torque capacity.

This new transmission is valuable for use in passenger and competition cars, highway and off-highway trucks, buses, agricultural and construction equipment, military vehicles, and industrial drives and machine tools.

With this invention it is possible to design transmissions having an extremely wide range of speed and torque variation at full power. This is required in construction and off-highway equipment, for example, where torque multiplication of the order of 18:1 and 24:1 may be encountered. Machine tool drives may require even wider ranges, and they are possible.

The use of this transmission in a piston-engine vehicle enables reduction of exhaust emissions and improvement in the specific fuel consumption by programming the engine to operate within its optimum range under all road conditions without regard to transmission torque output requirements. Both hydrocarbon and nitrogen oxide emissions can be minimized by optimizing the engine for operation in a specific narrow range. In addition, a smaller engine may be utilized for any application, as the transmission enables full engine power to be developed at any vehicle speed except for the lower speeds where the vehicle is traction limited. It is particularly desirable to operate turbocharged diesel engines in a narrow range of speed.

Rotary combustion engines can use this new transmission with the same advantages as for piston engines. The benefit in reduction of hydrocarbon emissions is therefore of a much greater magnitude, however, due to the high rate of change in emission characteristics for rotary combustion engines with respect to engine speed.

Gas turbines would also be benefited significantly by this invention. Manufacturing cost is a major drawback in producing a turbine today. This, to a large degree, is a function of the complexity required in the design of a turbine for use under the varying torque and speed conditions of a road vehicle. With the hydromechanical transmission of this invention, the turbine can be programmed to operate only under those conditions during which it is most efficient. Therefore, a single-shaft turbine becomes feasible, as it is more economical to manufacture than the two-shaft design normally proposed for vehicle application. Since constant-speed operation is feasible, the problems in connection with the throttle response time of a turbine do not arise. Because there is an infinite variation in speed and torque in the transmission, and no interruption of power flow occurs at any time, the turbine is never unloaded.

SUMMARY OF THE INVENTION

The power transmission of the invention includes, in combination with input means and output means, three planetary assemblies, each having its own carrier and its own planet, sun, and ring gears. The sun gears of the first two planetary assemblies are connected together on a common shaft, and a speed-varying module connected to the input is in driving relation with these sun gears. The speed-varying module may comprise a pair of hydraulic units hydraulically interconnected so that one serves as a pump while the other serves as a motor and vice versa, one of the hydraulic units being connected in driving relation to the input, and the other being connected in driving relation to the first two sun gears.

The input means also drives the ring gear for the second planetary assembly, and is clutchable to the carrier for the third planetary assembly. Both the sun gear of the third planetary assembly and the ring gear of the first planetary assembly are rigidly connected to the output shaft, which is also clutchable to the ring gear of the third planetary assembly. This third ring gear is rigidly connected to the second carrier.

A brake may be used for grounding the first carrier and causing the drive from the speed-varying module through the first set of planetary gears to be delivered to the output means through the first ring gear. The brake is a low-range clutching means used for both reverse and for starting in a Range I; the speed-varying module can be run in reverse, forward, or zero drive, and at varying speeds in forward or reverse, such as by respective strokings of a controlling wobble-plate.

The speed of the second planetary assembly carrier decreases during forward transmission drive in Range I and becomes equal to the speed of the ring gear of the first planetary assembly, because the first two sun gears are being driven in an opposite direction to the input means, so as to drive the output means in the forward mode, and this drive of the sun gears in the opposite direction to the input shaft, in combination with the ring gear of the second planetary assembly being driven at input speed, causes the second planetary assembly carrier to decrease in speed to the point where the speed of the second planetary assembly carrier may exactly equal the speed of the output shaft.

When the speed of the carrier of the second planetary assembly becomes equal to the speed of the ring gear of the first planetary assembly, then a clutch is engaged synchronously so as to connect the second planetary assembly carrier and the third ring gear with the output shaft, thereby introducing Range II. Immediately after this clutch is engaged, the brake is disengaged, so that during Range II the brake may simply be allowed to slip, producing very low loss, and the speed-varying unit drives the first two sun gears initially in the direction opposite to the input and then, later, in the same direction as the input shaft.

The speed of the ring gear of the second planetary assembly always runs at the speed of the input shaft, and the third sun gear always runs at the speed of the output shaft. During Range II the relative speed of the first two sun gears, running in the opposite direction from that of the input shaft at the lower end of Range II and driven by the speed-varying module, increases and approach the speed of the first and third ring gears, the third sun gear, and the third carrier, all of which in Range II run at the same speed. The speed of the first carrier also approaches that speed. Finally, a point is reached where the speeds of all of the planetary elements—the speeds of the rings, carriers, and suns of all three planetary assemblies—become equal, and then a second or high-range clutch is engaged putting the transmission synchronously into its high range, Range III, the first clutch then being disengaged. In Range III, the input shaft is clutched to the third carrier.

In this Range III, the speed of the first two sun gears decreases, while that of the third carrier remains constant, as does the speed of the second ring gear, of course. The speeds of the second carrier and third ring gear decrease together, while the output shaft is driven faster by the increase in speeds of the third sun gear.

The range shifts in this new transmission occur at synchronized speeds, without interruption of power flow on either the upshift or the downshift. The starting and reverse ranges are hydrostatic and are not considered part of the principal working ranges. In most cases, the starting and reverse ranges operate at less than maximum power and may approach a maximum constant torque, since maximum output torque may be limited by either maximum pressure or traction. The principal working ranges are the hydromechanical Ranges II and III, which may operate at full and constant horsepower.

Hydromechanical transmission have characteristics which are different from both gear boxes and torque converter transmission. Since hydromechanical transmissions develop full static torque, while at "stall," the engine needs to develop only the horsepower necessary to make up the transmissions' losses. This is considerably less horsepower than that required to develop stall torque in a torque converter transmission.

However, since this horsepower is a dead loss, with the vehicle standing still, the amount of heat developed may be greater than the average heat rejection requirement when operating in the full horsepower ranges. Therefore, one of three known methods of protecting against excessive temperature rise should be used as described in the immediately following paragraphs:

a. The transmission may have such a wide ratio as to exceed the traction limit in torque requirement.
b. Controls may be provided either to unload the hydraulic system, if torque capacity of the transmission has been exceeded, or to limit the engine input.
c. A large enough heat exchanger capacity may be supplied.

DESCRIPTION OF A PREFERRED EMBODIMENT

Figure 1:
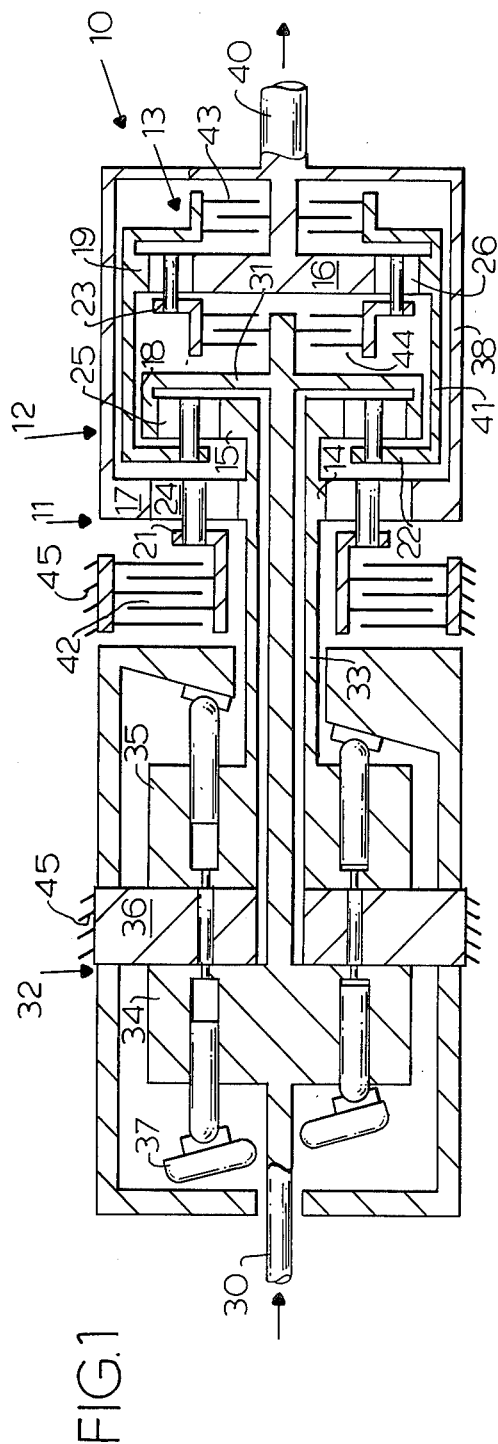
FIG. 1 is a diagrammatic view in elevation and in section of a transmission illustrating the principles of this invention.

A transmission 10 of this invention has three planetary assemblies 11, 12, and 13 having respective sun gears 14, 15, and 16; respective ring gears 17, 18, and 19; and respective carriers 21, 22, and 23 with respective planet sets 24, 25, and 26.

An input shaft 30 directly drives a connector 31, which is secured to the ring gear 18 of the second planetary assembly 12. The input shaft 30 is also drivably connected in a suitable manner to a speed-varying hydraulic module 32, the other end of which is suitably connected to a hollow shaft 33 that rigidly joins the first two sun gears 14 and 15 together. The module 32 comprises a variable-displacement hydraulic unit 34 in driving relationship with a fixed-displacement hydraulic unit 35, with hydraulic fluid transmitted between them through a stationary port plate block 36. A variable swash plate or wobble-plate 37 is on the unit 34.

The first ring gear 17 is rigidly connected, as by a drum 38, to an output shaft 40, upon which the third sun gear 16 is mounted. The second carrier 22 is connected, as by a drum 41 to the third ring gear 19.

A brake 42, when engaged, holds the first carrier 21 stationary with respect to a frame 45. A first clutch 43, when engaged, connects the second carrier 22, the drum 41, and the third ring gear 19 to the output shaft 40. A second clutch 44, when engaged, connects the third carrier 23 to the input shaft 30. The input shaft 30, output shaft 40, hydraulic units 34, 35 and planetary assemblies 11, 12, and 13 are preferably all coaxial.

Figure 2:
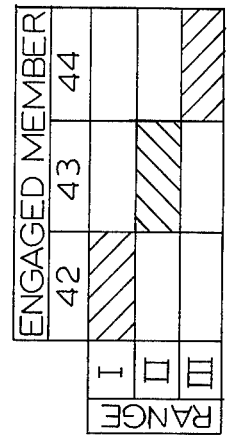
FIG. 2 is a brake and clutch engagement and range diagram.

When the brake 42 is engaged, the hydrostatic mode is in force, and neither of the two clutches 43 and 44 are engaged (see FIG. 2). The first planetary gears 24 rotate but are arrested in their planetary motion. This makes a reversing drive between the first sun gear 14 and the first ring gear 17, causing a rotation of the first ring gear 17 which is reversed in rotation to that of the first sun gear 14.

The hydrostatic low-range brake 42 is engaged for starting (and also for reverse), causing the driving connection between the sun gear 14 and the drum 41 through the planetary gears 24 and ring gear 17, causing the first ring gear 17 to run in a reverse direction and at a reduced speed with respect to the sun gear 14. The sun gear 14 itself is driven by the speed-varying module 32 during starting and reverse.

In this region the drive is purely hydrostatic, and when the variable-displacement hydraulic unit 34 is on zero stroke, the vehicle is at a standstill, since no drive is then coming through the speed-varying module 32 and since the brake 36 is engaged.

If the wobble plate 37 of the variable-displacement unit 34 is stroked in one direction, the transmission 10 is in reverse, and if the wobble plate 37 is stroked in the opposite direction, the transmission 10 is in forward. When the wobble plate 37 is stroked in forward, the sun gear 14 traverses in speed from zero to a negative speed, as shown in Range I in FIG. 3, and with the carrier 21 of the first planetary assembly 11 grounded by the brake 42, the first ring gear 17 increases from zero in output speed, as shown in Range I in FIG. 3.

During Range I, the drive on the second planetary gears 25 from the input through the second ring gear 18 is counteracted by the drive on the planetary gears 25 from the second sun gear 15, thus decreasing the speed of travel of the carrier 22.

Figure 3:
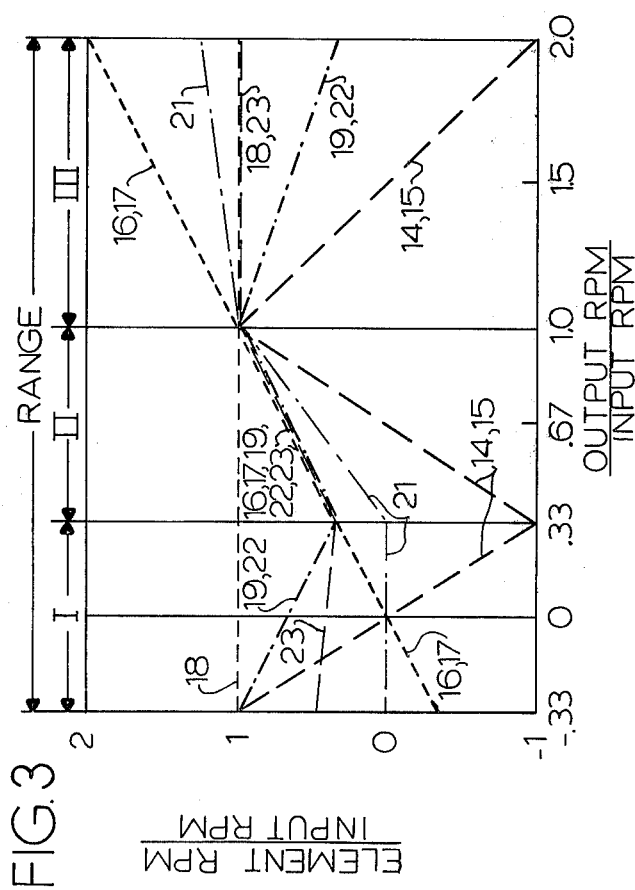
FIG. 3 is a speed lines diagram with the ratio of output speed to input speed in r.p.m. being plotted against the ratio of the speeds of the planetary members to the input speeds in r.p.m. The three forward ranges and the reverse range are identified.

Thus, during Range I the forward speed of the second carrier 22 decreases because of acceleration of the counteracting drive on the second sun gear 15, as shown in FIG. 3 until the forward speed of the second carrier 22 becomes equal to the forward speed of the first ring gear 17, at which point the first clutch 43 is engaged, and the transmission goes into Range II, the brake 42 then being released. The drive is then from the second carrier 22 to the output shaft 40. The first ring gear 17 from then on has no driving function, and the low-range brake 42 may simply slip producing some loss, but such losses are usually very low.

When the end of Range II is reached, the speeds of all the planetary elements—the suns, carriers, and rings of all three planetary assemblies—become identical, and it is then possible to engage the high-range second clutch 44, which puts the transmission into the high Range III. The speed of the output shaft 40 can continue to be increased, as shown in FIG. 3.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claim is:

1. A power transmission comprising:
   a stationary frame,
   input means,
   output means,
   first, second, and third planetary assemblies each having a sun gear, a ring gear, and a carrier with planet gears, the sun gears of said first and second planetary assemblies, being rigidly connected together, the ring gear of said first planetary assembly and the sun gear of the third planetary assembly being rigidly connected to said output means, the ring gear of said second planetary assembly being rigidly connected to said input means, and the carrier of said second planetary assembly being connected to the ring gear of said third planetary assembly, a reversible speed-varying module connecting said input means to said sun gears of said first and second planetary assemblies, braking means for releasably connecting said carrier of said first planetary assembly to said frame, whereby when said braking means is engaged, said output means is driven hydrostatically from said input means through said speed-varying module and said first planetary assembly, first releasable clutching means for connecting said carrier of said third planetary assembly with said input means, and second releasable clutching means connecting said ring gear of said third planetary assembly to said output means.

2. The power transmission of claim 1 wherein said speed-varying module comprises:

a pair of hydraulic pump-motor units hydraulically interconnected so that one serves as a pump while the other serves as a motor and vice versa, and a first said hydraulic pump-motor unit being connected in driving relation to said input and a second said hydraulic pump-motor unit being connected to said first sun gear.

3. A power transmission according to claim 2 wherein said first hydraulic pump-motor unit is variable in stroke and runs during operation at constant speed while said second pump-motor unit is fixed in stroke and variable in speed.

4. The transmission of claim 1 wherein said input means, output means, first planetary assembly, second planetary assembly, third planetary assembly, and said speed-varying module are all coaxial.

5. A power transmission comprising:

a stationary frame,
an input shaft,
an output shaft,
a first planetary assembly having first and second interconnected sun gears of different sizes, first and second ring gears of different sizes, said first ring gear being secured to said output shaft, said second ring gear being secured to said input shaft, and first and second independent carriers, each with its own set of planet gears, a second planetary assembly having a sun gear secured to said output shaft, a ring gear, and a carrier with planet gears, the second carrier of said first planetary assembly being connected to the ring gear of said second planetary assembly, a reversible speed-varying module connecting said input shaft to said sun gears of said first planetary assembly, braking means for releasably connecting said first carrier of said first planetary assembly to said frame, whereby when said braking means is engaged, said output shaft is driven from said input shaft through said speed-varying module and said first ring gear, first releasable clutching means for connecting said carrier of said second planetary assembly to said input shaft, and second releasable clutching means connecting the ring gear of said second planetary assembly to said output shaft.

6. A power transmission comprising:

a stationary frame,
input means,
output means, a reversible speed-varying module connected to said input means, a plurality of planetary assemblies, each having three members, a first member of a first said assembly being respectively rigidly connected to a first member of a second said assembly and to said module, a second member of said first assembly being rigidly connected to said output means, a second member of said second assembly being rigidly connected to a first member of a third said assembly, a second member of said third assembly being rigidly connected to said output shaft, a brake for releasably connecting the third member of said first planetary assembly to said frame, a first clutch for releasably connecting the third member of the said third assembly to said input means, a second clutch for releasably connecting said second member of said second assembly and said first member of said third assembly to said output means, the third member of the said second planetary assembly being rigidly connected to said input shaft, the members connected to said speed-varying module serving, when said brake is released, as reaction members.

* * * * *